United States Patent [19]
Siegel

[11] Patent Number: 6,148,286
[45] Date of Patent: Nov. 14, 2000

[54] METHOD AND APPARATUS FOR DATABASE SEARCH WITH SPOKEN OUTPUT, FOR USER WITH LIMITED LANGUAGE SKILLS

[76] Inventor: Steven H. Siegel, 468 11th St., Brooklyn, N.Y. 11215

[21] Appl. No.: 09/428,201

[22] Filed: Oct. 27, 1999

Related U.S. Application Data

[62] Division of application No. 09/303,165, Apr. 30, 1999, Pat. No. 6,009,397, which is a division of application No. 09/136,651, Aug. 19, 1998, Pat. No. 5,953,692, which is a division of application No. 08/485,164, Jun. 7, 1995, Pat. No. 5,799,267, which is a continuation-in-part of application No. 08/278,928, Jul. 22, 1994, abandoned.

[51] Int. Cl.[7] .............................. G09B 5/00; G09B 19/04; G10L 13/00
[52] U.S. Cl. ......................... 704/270; 704/260; 434/169; 434/176; 434/185
[58] Field of Search .................................. 434/167, 169, 434/176, 185; 704/260, 270

[56] References Cited

U.S. PATENT DOCUMENTS

| | | | |
|---|---|---|---|
| 5,203,705 | 4/1993 | Hardy et al. | 434/169 |
| 5,223,828 | 6/1993 | McKiel, Jr. | 340/825.19 |
| 5,287,102 | 2/1994 | McKiel, Jr. | 340/825.19 |
| 5,429,513 | 7/1995 | Diaz-Plaja | 434/167 |
| 5,706,493 | 1/1998 | Sheppard, II | 707/1 |
| 5,740,390 | 4/1998 | Pickover et al. | 345/348 |
| 5,745,776 | 4/1998 | Sheppard, II | 707/532 |
| 5,801,692 | 9/1998 | Muzio et al. | 345/339 |
| 5,813,861 | 9/1998 | Wood | 434/169 |
| 5,820,386 | 10/1998 | Sheppard, II | 434/322 |

OTHER PUBLICATIONS

Richard S.Schwerdtfeger, Making The GUI Talk, Dec. 1991, p. 118.

*Primary Examiner*—David R. Hudspeth
*Assistant Examiner*—Tālivaldis Ivars Šmits
*Attorney, Agent, or Firm*—Ratner & Prestia

[57] ABSTRACT

A method and apparatus which allows a user with minimal understanding of the orthography of a language to nevertheless use its orthography as the basis for performing a database search. Orthographic information is displayed. When a user indicates a possible selection of this information by, for example, placing a mouse cursor over the displayed information the selection is pronounced. When the user selects this information by, for example, clicking a mouse button, the input data associated with the information may be used for a database search, and the results presented to back the user aurally. According to another aspect of the invention, the results may also be presented orthographically. According to another aspect of the invention, the results may also be presented pictorially. According to another aspect of the invention, when the user indicates a possible selection of an orthographically presented result by, for example, placing a mouse cursor over ie result, the result is pronounced. According to another aspect of the invention, when the user indicates a selection of a result by, for example, clicking a mouse button, more information about the result may presented orthographically, pictorially, via animation, or by a combination of the three.

24 Claims, 5 Drawing Sheets

METHOD AND APPARATUS FOR DATABASE SEARCH WITH SPOKEN OUTPUT, FOR USER WITH LIMITED LANGUAGE SKILLS

This application is a division of U.S. patent application 09/303,165 filed Apr. 30, 1999, now U.S. Pat. No. 6,009,397, which is a division of U.S. patent application 09/136,651 filed Aug. 19, 1998 now U.S. Pat. No. 5,953,692, which is a division of U.S. patent application 08/485,164 filed Jun. 7, 1995 now U.S. Pat. No. 5,799,267, which is a continuation in part of U.S. patent application 08/278,928 filed Jul. 22, 1994, abandoned.

FIELD OF THE INVENTION

The present invention relates to the field of educational tools generally, and specifically to educational tools for individuals who do not yet know how to read.

BACKGROUND

Computer technology has become ubiquitous in our society. Computers are increasingly used in the workplace, in the home and at schools. Many applications for computer technology exist which increase productivity by performing, with minimal intervention or direction, a number of repetitious mechanical tasks that are a necessary part of the more complex tasks which are performed every day in our society.

To effectively interact with a computer application using either keyboard or a graphical user interface (GUI), a user must have a good working knowledge of the natural language used in the interface of the applications. Persons who cannot read a language, either because they do not yet possess the necessary basic skills due to their age or development, or because they are not familiar with the natural language in its graphical form, are at a disadvantage using this type of a user interface.

Graphical user interfaces for some types of programs, both in commercial and educational applications, have attempted to fill this gap by providing selection based on the first letter of a word or by using a letter-based menu selection system to advance through a set of words. In response to a selected letter, these systems may display a group of words having the same first letter. An example of the former is the Index function in the Help menu of the Microsoft Excel® spreadsheet program.

While this type of interface does make these applications somewhat more accessible to individuals who are unfamiliar with the orthography of a language, it is not sufficient to allow one with some language skills but little or no orthographic knowledge to effectively use the application.

SUMMARY OF THE INVENTION

The present invention is embodied in a method and apparatus which allows a user to perform a database search based on the orthography of a language, although the user may not be familiar with this orthography. The search may be executed by an individual, such as a young child who, while understanding a language, may have minimal understanding of its orthography. Orthographic information is displayed. When a user indicates a possible selection, the selection is pronounced. When a user makes a selection, its associated information is used for a database search.

INTRODUCTION

Figure 1:
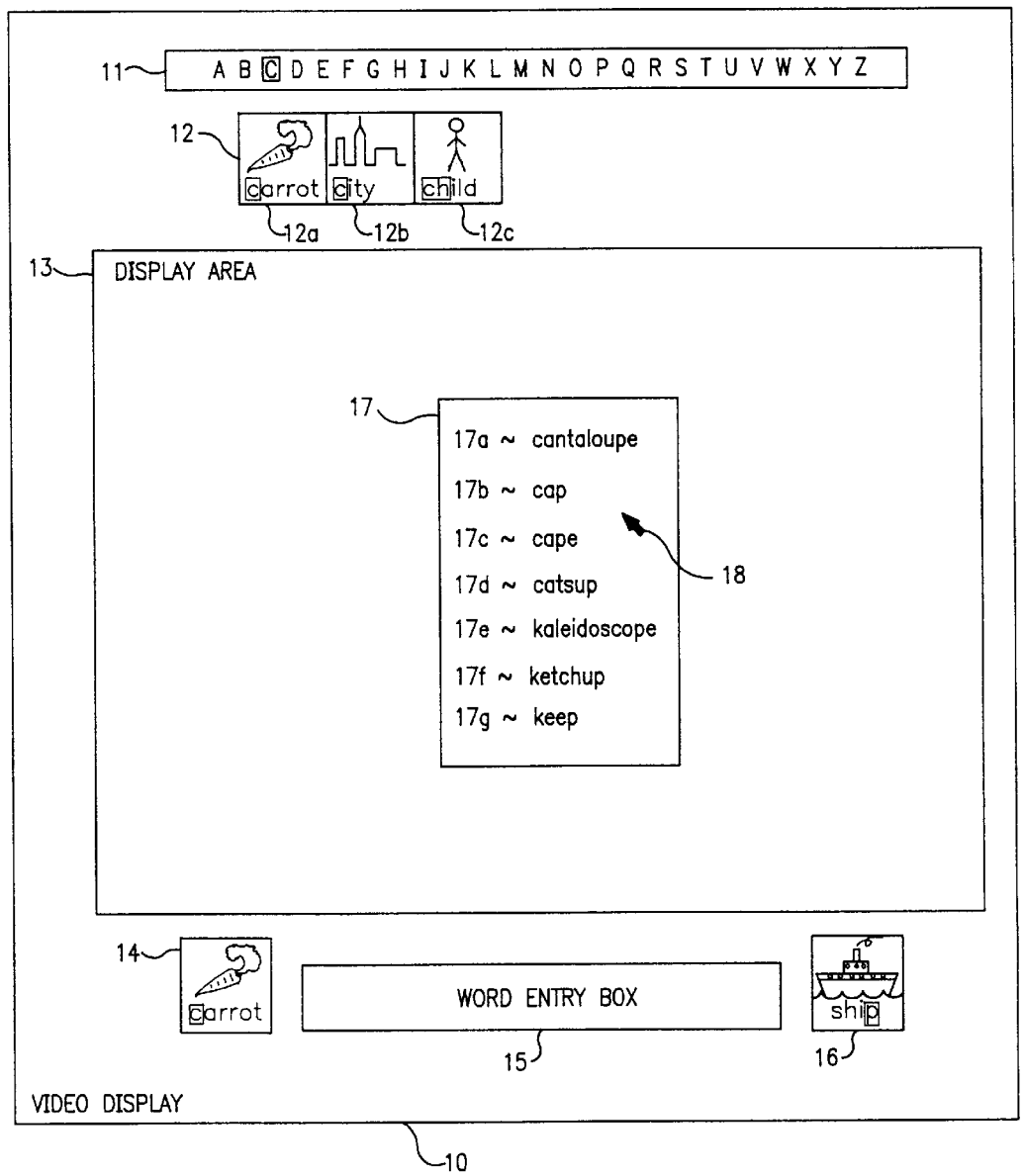
FIG. 1 shows a computer video display executing a process according to the present invention within a software program.

The present invention is embodied in a method and apparatus that enables young, pre-reading children to use components of written, phonetic or phonemic representations of language for communication. It may be implemented in software, as a mechanical device, as a dedicated electronic device, or as a combination of the three.

The apparatus (hereafter referred to as the "Phonic Engine") allows children (and other users) to convert their minimal phonological knowledge into written language or make selections of items represented by words using only minimal language components. The inventor has discovered that the following two concepts can be effectively paired/combined to provide an unexpected result:

(1) phonetic/phonemic knowledge of initial and final sounds are among the first bits of language knowledge acquired; and (2) Two bits of orthographic or phonological information about a word or group of words provides sufficient information to select a perusable set of entries containing that word or group of words, from a suitable larger set of entries. That is, early pre-reading phonic knowledge or basic orthographic knowledge may be mapped to criteria which are then converted into a word or group of words, such as a title.

For example, a 5000 entry children's software dictionary, encyclopedia, or other work may be used (hereafter referred to as "the database"). It is assumed that there are approximately 44 phonemes included in the words in the database (corresponding to the number of phonemes in the English language). For purposes of estimation, it is further assumed that initial and final phonemes are randomly distributed among the entry headings. (A database having this characteristic could be built intentionally.) For this example, specifying initial and final phonemes narrows down the 5000 entries ≅(5000 /44)/44¯2.58 (mean average). If these entries are then presented via spoken words and/or pictures, a child can easily select the one that he or she intends to select.

Hereafter, a sound is indicated by enclosing a letter, blend, prefix, suffix or other sound description between slashes (/). For example, the phonemes represented by /n/ and /m/ in initial and final positions, respectively, appear in the words "name", "nighttime", "numb", and possibly several other words from a children's dictionary. If a user wishes to find one of these words in a software dictionary, and specifies the phonemes /n/ and /m/, the Phonic Engine presents the user with these three options. In a software encyclopedia, the phonemes /long a/ and /n/ would specify a group of entries including, for example, "Abraham Lincoln".

In an exemplary embodiment of the Phonic Engine, means are provided for (1) initially selecting the phonemes; (2) creating and displaying a list of words containing the phonemes in initial and final positions; and (3) selecting the desired entry. For a pre-literate or non-literate person, visual and/or auditory cues may be provided. It is contemplated that other orthographic information, such as prefixes and/or suffixes may be provided in the initial selection process. As used in this application "orthographic information" includes information that is more complex than just initial letters. It comprises, but is not limited to prefixes, suffixes, blends and root words. The exemplary Phonic Engine includes input means. The method of inputting selections depends on the individual hardware configuration of the user's system. One of ordinary skill in the art of software development could readily program a computer or workstation to receive user inputs from a keyboard or from a menu using a pointing device. Depending on the hardware configuration of the computer, inputs may optionally be received by alternative means, such as across a network, from scanning a document, from voice, interactive television, or from a remote control device.

It is contemplated that the Phonic Engine may be incorporated into other types of software programs, or dedicated devices. For example, the Phonic Engine may be incorporated within a software program for accessing data in a reference document, a dictionary, an encyclopedia, an almanac, etc. When the information is stored as data in a database, entries of interest may be retrieved by the Phonic Engine using language as the search criteria, even though the user does not know how to read or write.

In addition, it is contemplated that the Phonic Engine may be used to implement control functions, for example, to access an electronic program guide database in a television system in order to select a program for viewing.

If the Phonic Engine is incorporated into a writing program or word processor, it assists a non-literate person in writing a story. If the Phonic Engine is used in conjunction with a mechanical sorting device, it can form the basis of a word game or other game.

DETAILED DESCRIPTION

The first exemplary embodiment of the, Phonic Engine is implemented as software in a reference work, specifically, a Talking Dictionary, a multimedia dictionary for children. The exemplary Talking Dictionary may be executed on a computer configured for multimedia presentation, such as a Macintosh computer including a display, pointing device, CD-ROM drive, sound generation, and text to speech conversion capability. Other hardware configurations may also be used.

TALKING DICTIONARY

The Talking Dictionary contains word entries. Each entry is associated with some or all of the members (attributes) listed in Table 1. It is contemplated that other attributes, such as (but not limited to) shape, color, size may also be incorporated into the entries.

TABLE 1

(1) the spelled word (optional)
(2) phonetic/phonemic representation of the word
(3) definition
(4) usage example
(5) sound effect
(6) pronunciation
(7) picture (may include the spelled word in the picture)
(8) animation (optional)

The Talking Dictionary offers a variety of activities and ways to look up a desired word; these methods are listed in Table 2.

TABLE 2

(1) by identifying initial/final sound
(2) by spelling
(3) by identifying attribute (such as shape, color and size)
(4) by selecting the beginning letter and then perusing a list of alternative selections;
(5) the user may try to sound out randomly generated or selected sets of words - verified by the computer;
(6) the user may find the initial/final sounds (and other phonological units) of randomly generated or selected sets of words - verified by the computer;
(7) matching picture or animation to a word;
(8) Write Story; or
(9) Read Story Of the methods listed in Table 2, method (1) for finding a word by initial and final sounds is described in detail, below, with reference to FIGS. 1–3. Method (1) may be incorporated into a method for writing a story, which may be implemented as a separate application. The methods for writing and reading a story are also described below.

FIG. 1 shows the video display 10 of a computer executing an exemplary Talking Dictionary program in accordance with the invention. The Talking Dictionary shown in FIG. 1 includes six specified fields within display 10. Each field 11–16 is first described with reference to FIG. 1. The program flow is then described below with reference to FIG. 3.

Referring to FIG. 1, the first field is an alphabetic strip menu 11. Alphabetic strip menu 11 is used to select letters. Letters are selected using a pointing device (e.g., by pointing the cursor 18 of a mouse at one of the letters in alphabetic strip menu 11 and clicking the mouse). When a letter is selected, the initial allographs 12a–12c associated with that letter are displayed in an allograph area 12. The allograph is displayed as part of a word with corresponding picture or animation. The user selects the desired initial allograph (e.g., 12a in FIG. 1) by dragging and dropping the allograph 12a into the initial sound box 14. The user selects the desired final allograph by selecting a letter associated with the final allograph from alphabetic strip menu 11, selecting a desired allograph from a displayed list of allographs corresponding to the selected letter, dragging the desired allograph from allograph area 12 and dropping the allograph into the final sound box 16.

A list 17 of words 17a–17g within the Talking Dictionary database that start with the initial sound of the word in the initial sound box 14 and end with the final sound of the word in the final sound box 16 are displayed within a display area 13. One of the words 17a–17g is selected by dragging and dropping the word into the word entry box 15. Alternately, the initial and final allographs and the target word may be selected by simply pointing to the corresponding picture and indicating a selection, for example by "clicking" a button on the mouse. The program can determine, from the context of the selection process, whether the selected allograph is an initial sound or a final sound and whether the selected word is the target word.

OPERATION

The execution flow of the Talking Dictionary program is now described with reference to FIG. 3. At step 20, when the "Initial/Final Sounds look-up activity" program is executed, alphabetic strip menu 11, allograph area 12, initial sound box 14, final sound box 16, word entry box 15 and a display area 13 may be displayed. A voice provides spoken instructions on use of this activity.

Alphabetic strip menu 11 appears across the top of the screen. The strip menu 11 contains the alphabet, and provides a means for indicating phonemes. The user is then prompted (for example, by a spoken message) to select an initial sound. This is accomplished by selecting a letter.

In one exemplary system, a user may be assisted in selecting a letter from the alphabetic strip menu by software which pronounces the names of the letters as the selection pointer is dragged across the alphabetic strip. In this instance, pointing at a letter without clicking is interpreted as indicating a possible selection.

At step 30 a first letter is selected. Users approximately kindergarten age or older typically are sufficiently familiar with the alphabet to select a letter appropriate for the desired sound much of the time. The exemplary embodiment also assists users that do not have sufficient knowledge of the alphabet to identify the first letter. Pre-kindergarten children may also explore with the talking dictionary, receiving reinforcing animations and language knowledge while simply playing. When any letter is selected, the allographs that appear in the initial position of words in the dictionary and begin with that letter are displayed underneath strip menu 11, in allograph area 12. For example, when the letter "c" is selected, the allographs 12a–12c representing /hard c/ (carrot), /soft c/ (city) and /ch/ (child) are displayed in allograph area 12. Both the word and an associated picture or animation may be displayed, with the initial allograph highlighted, as shown in FIG. 1.

The more engaging the picture or animation, the better. If a child hears a pig snort and say "oink" when he or she clicks on "oi", that allograph is more likely to be remembered. If a child hears an amusing argument between the two pronunciations of "either", he or she is more likely to remember that "ei" can represent either /long e/ or /long i/. Rules of orthography may also be presented (such as i before e, etc.)

Referring again to step 30 of FIG. 3, once the allographs 12a–12c are displayed in allograph area 12, the user may be prompted by a spoken message to select one of the allographs. The user selects an allograph 12a by, for example, pointing the cursor 18 of a mouse (not shown) on the allograph. When an allograph 12a is selected, a voice pronounces the allograph, along with any necessary explanatory information.

When the letter c is selected, as shown in FIG. 1, pictures of a carrot, city and child are shown, along with associated allographs c, c, and ch (perhaps others) and words. If the carrot is selected, as shown in FIG. 1, a voice may say, "This is the letter c. It can make the sound /k/ as in carrot." If allograph 12b for city is selected, a voice may state, "This is the letter c. It can make the sound /s/ as in city." If allograph 12c is selected, a voice may state, "The letters ch together can make the sound /ch/ as in child."

At this point, a user that is unfamiliar with the alphabet may realize that none of the allographs displayed for the letter "c" represents the desired phoneme. The user then selects a different letter from alphabet strip menu 11, and continues to select allographs until the user finds a letter and allograph that correspond to the first sound of the desired word. When the user finds an allograph corresponding to the desired initial sound of the word, he or she drags the allograph and drops it in the initial sound box 14. The Talking Dictionary displays a representation of that allograph in the initial sound entry box and stores the phoneme associated with that allograph in a temporary variable.

It is emphasized that the phoneme itself is actually selected by the exemplary selection method, not the allograph. For example, selection of the allograph k in initial position, along with t in the final position would represent carrot and cat, just as c would. And choosing the hard c in carrot (along with final sound /s/), would bring up class and kiss during a search of the database, but not circus.

In this way, grapheme/phoneme correspondence is presented, but not forced, because any allographs representing the same initial/final sounds produce the same results. Thus, the child is gently exposed to grapheme/phoneme associations, and encouraged to use this information for reinforcing material, but is not punished for a spelling error.

Referring again to FIG. 3, at step 40, a nearly identical (to step 30) procedure is followed for selecting the final sound. A letter is selected from alphabetic strip menu 11. Final allographs with corresponding pictures and words which are associated with the selected letter are displayed in allograph area 12. As shown in FIG. 1, selecting the letter "p" to indicate the final allograph may, for example, result in a picture of a ship (which ends with the phoneme /p/). The final allograph and its associated information are selected, dragged and dropped into the final sound entry box 16. A representation of the final phoneme associated with that allograph is then stored in a temporary variable.

At step 50, once initial and final sound selections are complete, a search loop may be entered to find all matching entries in the dictionary database. The initial and final phonemes are matched against the entries in the dictionary. Each entry in the database contains a phonetically (or phonemically) coded representation, and the indicated initial and final phonemes are compared against the initial and final phonemes of each entry.

Table 3 lists pseudocode that may be used to perform a search of entries having the desired initial and final sounds.

TABLE 3

| | |
|---|---|
| 100 | for all dictionary entries |
| 110 |   compare initial phoneme |
| 120 |   if match |
| 130 |     compare final phoneme |
| 140 |     if match |
| 150 |       save in buffer (save word, pronunciation, special information, and pointer to entry/record locator information) |
| 160 |     else |
| 170 |       move on to next |
| 180 |   else |
| 190 |     move on to next |

Reference is again made to FIG. 3. If, at step 60, no word is found by the search, then at step 70, a spoken voice message tells the user that no words were found by the search. Control passes to step 30, and the user is prompted to select a new initial sound.

At step 60, if any words are found by the search, this procedure produces a list of matched entries, which is then presented to the user to peruse at step 80.

At step 80, the list 17 of matched entries 17a–17g is presented to the user. For example, if the initial and final phonemes /k/ and /p/ are selected in steps 30 and 40, then at step 80, the list 17 may appear as shown in FIG. 1. Because the phoneme /k/ is selected, the list 17 may include words that begin with the phoneme /k/, regardless of spelling; in the exemplary display of FIG. 1, words that begin with the letters "c" and "k" are displayed. The list 17 may be presented as a list of printed words, as shown in FIG. 1, as a set of pictures, representing the words, or as a combination of printed words and pictures.

If there are many entries (e.g., if the initial sound is /s/, which contains many blends), a secondary indicator sound may optionally be used to narrow down the list. For example, the user may be asked to identify a third sound that appears in the word between the initial sound and the final sound.

Referring again to step 80 of FIG. 3, once the list 17 of words is displayed, the words are highlighted and pronounced in succession. Optionally, the voice message may also include special information about words: homonyms, double pronunciations, etc. At any time, the user may select a word 17a–17g, using the pointing device, or by pressing the "enter" button while a word is highlighted. When a word is selected, it may be verified by voice, saying for example: "The word you selected is '<word>'. Is this the word you want?"

If the user indicates "yes", by activating a control button on the screen (not shown) then, at step 90, the word is displayed in the word entry box 15 and an animation may be displayed in the display area 13.

Alternatively, once a user has initiated a search for items matching the initial and other sound, a matrix containing pictures and/or words will be displayed. This matrix may use several pages depending on the number of matching entries that are found. When the user rolls the mouse pointer over a picture or word, indicating the item as a possible selection, if there is a word associated with the item it will be pronounced. When the user selects a picture or word, the display area may show a definition or other material about the word. In addition, a filmstrip icon may be displayed allowing the user to view a short animation about the word. In addition, the program may pronounce the selected word. In this implementation, the information is not provided in a fixed sequence, but the user is allowed to focus only on information of interest using, for example, a "point and click" selection technique. Synchronization between animation and sound will occur as an artifact of using Video for Windows®, or Quicktime video either for Windows® or for Macintosh®.

Once an entry is located, it is displayed as a combination of the attributes listed in Table 1, according to sequencing information found in the associated database record. The user may repeat the display by clicking on the selected word.

At step 90 of FIG. 3, an entry may be presented by the Talking Dictionary in a variety of ways as explained in the following paragraphs.

Figure 2:
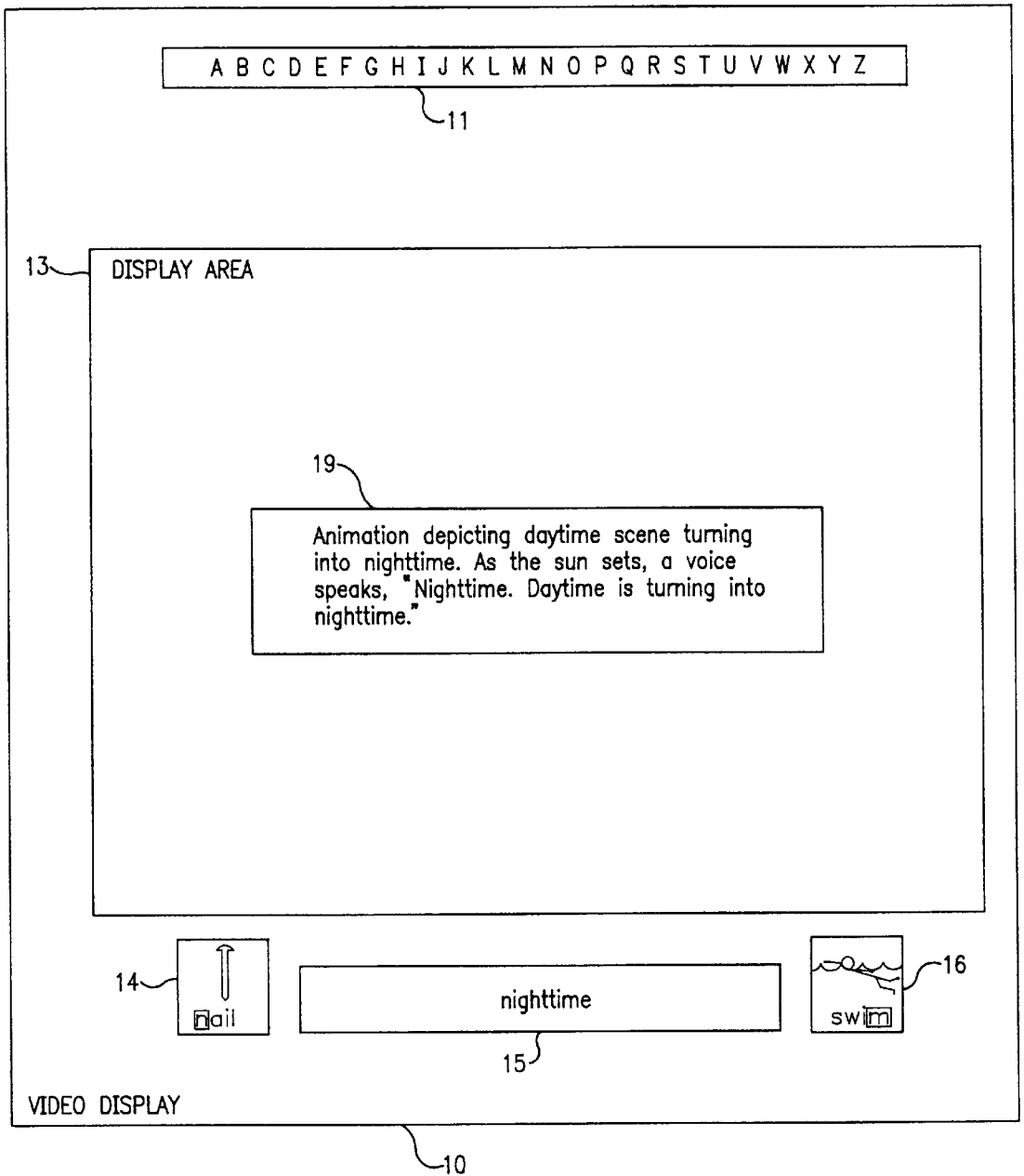
FIG. 2 shows the video display of FIG. 1, displaying animation in the display area.

For example, as shown in FIG. 2, selecting the phonemes /n/ and /m/ as initial and final sounds may result in list 17 including the word "nighttime". If "nighttime" is selected, an animation 19 depicting a daytime scene turning into nighttime may be displayed in display area 13. In another example (not shown), if the word "tall" is displayed, a picture or an animation of a skyscraper may appear in a display area 13.

An exemplary animation for the word "tall" (not shown) may include the following: A boy and his mother are standing in front of a skyscraper. The boy looks up at the skyscraper and exclaims, "Wow, mom, that's a tall skyscraper!" On top of the skyscraper is King Kong. He jumps off, screaming "yippee i o ky ay!" Then King Kong's parachute opens, and he smiles and winks. The boy and his mom giggle. Beneath the animation, the words "Wow, mom, that's a tall skyscraper!" are displayed. Each word or group of words is highlighted as the boy utters the word. The word "tall" is emphasized. For example, "tall" may be displayed in a different color, reverse video or italicized. The user may select any of the words in the sentence using a pointing device or keyboard. As each word is selected, it is pronounced. When the word "tall" is selected, the animation is repeated. The optional animation may be especially effective for conveying and reinforcing concepts or abstract ideas such as "near" and "far" or "freedom".

It will be understood by one of ordinary skill that instead of animation, a still picture of the skyscraper may be displayed in display area 13, and the sentence, "Wow, mom, that's a tall skyscraper!" may be displayed beneath the picture. Again, each word is highlighted as it is uttered by a voice. The user then has the same option of selecting any of the words displayed.

It will be understood by one of ordinary skill in the art of designing educational tools that some onomatopoeic words (or other words) may be reinforced by the production of sounds at step 90, without animation or pictures. The Talking Dictionary allows each word to be reinforced by the respective medium/media that best suit(s) that word.

OTHER VARIATIONS

Many variations of the exemplary method and system are contemplated. For example, if the letter e is chosen at steps 30 or 40 of FIG. 3, several pictures may be shown. The initial allographs associated with the letter "e" are displayed, along with associated pictures. A question mark and a package tied with a bow may also be shown. Below the question mark is the allograph "ei" and the word "either". When the question mark is selected, a voice responds, "The letters 'ei' can make the sound /long e/ as in either. An animation demonstrating the concept of "either" is shown. When the package is selected, a voice responds "When you use the letters 'ei' or 'ie', think of this: i before e except after c, or when sounding like /long a/ as in neighbor or weigh." An animation is shown to illustrate the point.

Optionally, when the question mark is selected, the voice may indicate that "ei" can be pronounced /long i/ as in "either."

A variation is contemplated wherein the matched list is presented with graphic indicators (pictures, animations, etc.) instead of, or in addition to, the pronunciation.

Another variation is contemplated wherein the Phonic Engine is coupled with an encyclopedia or other work. In this case, the text heading of each entry would be searched on, which may include more than one word. Also, the entry may be presented using a combination of one or more media elements, including pictures, movies, text, animation, or sound to depict an event, biography, place, thing, or other entry.

A variation is contemplated wherein the allographs are displayed with associated animations instead of pictures. These may be random associated animations drawn from the Talking Dictionary's database.

Figure 3:
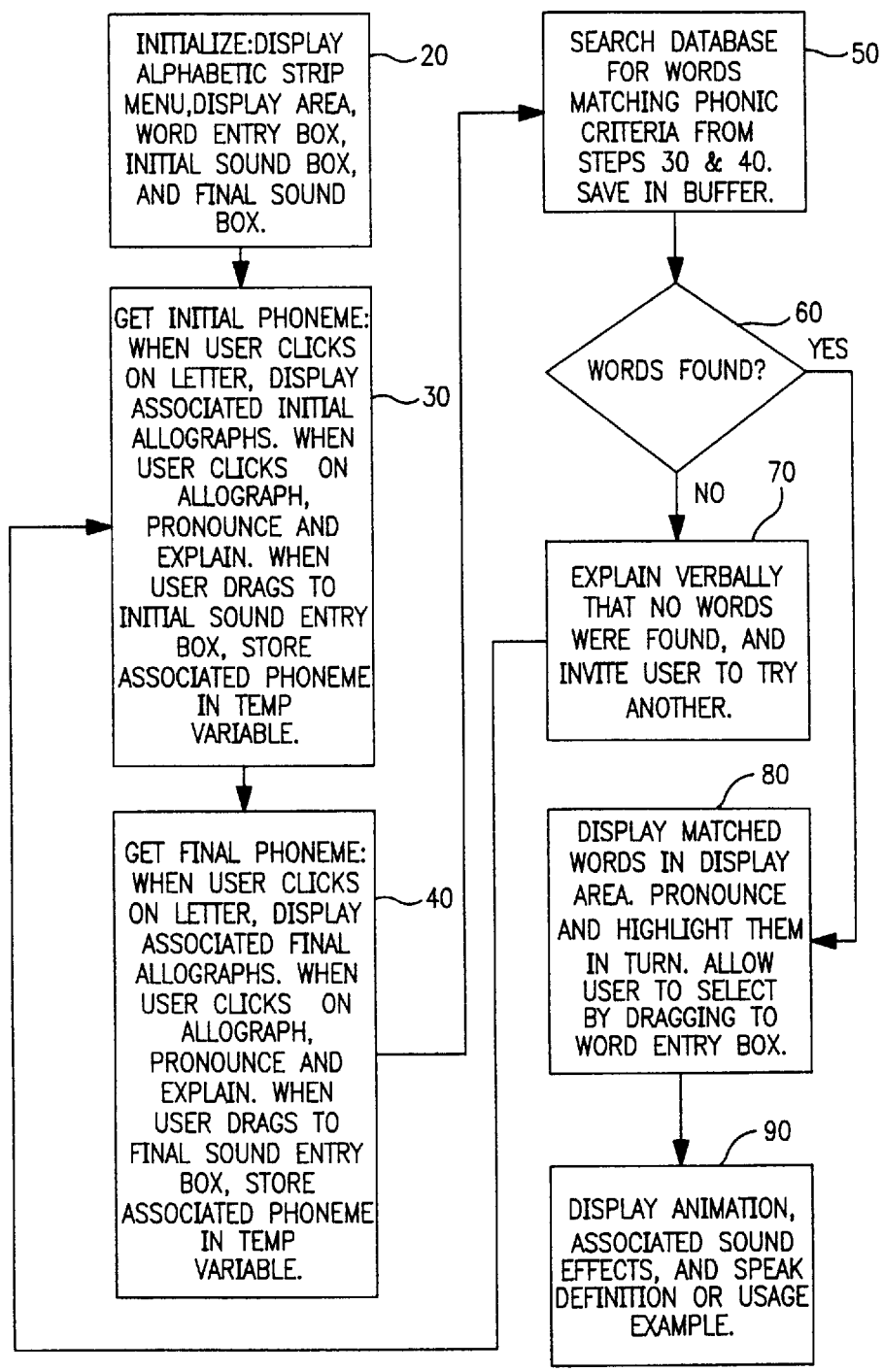
FIG. 3 is a flow chart diagram showing an exemplary method according to the invention.

Initial/final sound selection may also be accomplished via a number of alternative methods which may be used instead of, or in conjunction with, the method shown in FIG. 3. One alternative is the use of a simplified phonetic/phonemic alphabet. Whereas the method discussed above with reference to FIG. 3 allows selection of phoneme via grapheme, the alternative method would allow selection of phoneme directly. Optionally, this method may also provide secondarily an association with the corresponding grapheme. Of course, the allographs presented in the selected process need not include all of the allographs in the grapheme but may include a subset, for example, only those allographs that are likely to be familiar to a particular class of user or only those allographs which occur in the particular selection database that is being used.

Using the method of direct sound selection, the strip menu 11 would contain a representation for /a/ /b/ /k/ etc., as well as /au/ /aw/ and others. As an example of usage: if a user wishes to look up the word "back", he or she indicates /b/ as the initial sound, and /k/ as the final sound. When /b/ is selected, a picture of a boy appears along with the letter "b". Then, a voice may say, "This is the sound /b/. It is made with the letter 'b'". If /k/ is selected, pictures of a kite and a carrot may appear, with the letters k and c, respectively. A voice may then say: "This is the sound /k/. It can be made with the letters 'k' or 'c'."

Although the exemplary embodiment includes the use of an initial sound and a final sound, other embodiments are contemplated in which (1) initial and median sounds are used; and (2) initial, median and final sounds are used. In another alternative variation, it is contemplated that various phonetic/phonemic combinations and/or orthographic combinations may be used, based on or tailored to the knowledge of the user. One may, for instance, incorporate prefixes or suffixes as selection criteria for a suitable audience.

If there is some phonetic/phonemic or orthographic knowledge which could be used as discrimination criteria by an individual who has a particular handicap, that information may be incorporated to be used for leverage for that individual.

For example, to suit a group of users who have difficulty discriminating initial sound (or for other reasons), final and other, median and other, or final letter and median sound, etc. may be used. To suit a group of users who have difficulty in sound discrimination (or for other reasons), sounds and orthographic information may be remapped in any fashion, to enable those users to use language via this method.

It is understood by one of ordinary skill in the art of computer programmning that a variation of the exemplary method may be constructed, in which the user is given a choice between entering a median sound or a final sound. The user may then use whichever combination of first sound and other (i.e., median or final) sound that provides a shorter list 17 from which to select the desired word. It is also understood by one of ordinary skill in the art of computer programming that if list 17 is long, it may be presented in columns and rows or in any other suitable arrangement.

In another alternative variation, instead of having entries coded phonetically, a rule based algorithm may also be used for the search.

In a further alternative variation, a concordance structure representing all combinations of initial and final phonemes may be used. If a concordance is used, each entry in this structure has pointers to (or indices of) words containing a respective combination of initial/final phonemes in the dictionary database. The search would then consist of locating the particular phoneme pair under consideration in this secondary structure; retrieving index information; and then using this information to retrieve the desired entry information from the dictionary database or another concordance.

It will be understood by one having ordinary skill in the art of computer programming that the choice of grapheme/phoneme correspondence, or phoneme/grapheme correspondence may be implemented as an option within the software. The two methods could be used together, for instance augmenting a grapheme/phoneme selection list with a phoneme/grapheme list for vowels only.

Alternatively, three options (phoneme list, phoneme/grapheme list and grapheme/phoneme list) may be provided, each option directed to users of a respectively different stage in language development. A phoneme list may be used first by users who have no experience with the alphabet. At a later stage of language development, a phoneme/grapheme list is used. Eventually, the user's language skills become sufficiently advanced to use a grapheme/phoneme list.

It will be understood by one of ordinary skill in the art of programming educational software that the initial/final sound method of FIG. 3 may be expanded into a method for writing a story, hereafter "Write Story". This variation allows a user to create an animated story, even if the user is not able to read or write. A writing area (not shown) is displayed in which a story may be composed. The user may use one of the word look-up methods listed above in Table 2 to look up words that are added (one at a time) to the story. Additionally, a mechanism is provided whereby the user can write, using his or her own invented spellings. If the user wishes to have an animation associated with the word, he or she may then have the word checked. If the word is not recognized, the user is coached to verify the initial and final sounds, and this is used, in conjunction with other means, to help ascertain the word the user is trying to write.

If the database does not include the right word (e.g., if the user misspells a word), the system may include a method for displaying an animation for the misspelled word. The user may also select his or her own invented spellings along with animations.

Once the story is complete, it is displayed and/or read back to the user. The user is then given the opportunity to select individual words; selecting one of the words initiates display of the associated animations and sounds.

The method hereafter referred to as "Read Story" provides a means to have any written text spoken and displayed as an animated story. It also provides a means for whole language instruction.

When the Read Story feature is selected, the user has an opportunity to select a document. The document may be a letter, story, or other document written by the user, a parent, friend, or teacher, or a well known piece of children's (or other) literature. The selected story is read aloud, and the individual words are highlighted as they are read. When a user selects a word, a corresponding animation is presented, from the internal database.

Because all or most of the words in the database have associated pictures, animations, pronunciations, and/or sounds, this associated information may be used to present a wealth of activities based on:

(1) picture/word correspondence;

(2) word/sound correspondence;

(3) word/letter correspondence;

(4) letter/sound correspondence, etc.

Amusing activities may also be included, such as mixing up definitions and pictures, and letting children detect and correct the errors.

CREATING THE DATABASE

The number of words in the database (dictionary) is selected to be suitable for users in a desired age range or other desired criteria. The maximum number of words that is displayed in list 17 (shown in FIG. 1) is related to the number of words in the database and the distribution of initial and final sounds for the entry headings in the database. In an extensive database, or a database that, for some reason, has many entries for a single initial/final phoneme pair, it is theoretically possible to overfill the display area (Once the database is complete, the maximum display area needed to display text headings for each initial/final sound pair can be determined). In that case, a mechanism should be provided for scrolling, paging, etc. Alternatively, the size of the dictionary and/or the distribution of initial and final sounds of the words in the dictionary may be adjusted to eliminate the chance of overfilling the display.

For each word, a data record is created containing the following:

1. the correctly spelled word (text) (optional)
2. phonetic/phonemic coding of the word (text) or numeric data
3. definition (text)
4. definition (digitized sound; if text to speech, the text definition may be used instead)
5. pronunciation (digitized sound; if using text to speech, the correctly spelled word may be used instead.)
6. sound effect (digitized sound)
7. picture
8. animation or still picture (may include word text as part of graphic)
9. usage example (text, if using text to speech; or digitized sound)
10. special information (exception information); codes representing various conditions, such as homonyms
11. sequence information These records are grouped into a database. The database may be a table, arranged in alphabetical order by word, and stored on a sufficiently large medium. Because the entries are accessed by initial and final sound, it may be desirable to create a secondary table of all the possible initial/final sound combinations, to increase speed. Preferably the table has pointers to the associated digitized graphic and sound entries. The table is stored in a medium that may be accessed rapidly by the processor.

The animation may be stored as a PICS file or series of PICT files on a Macintosh computer manufactured by the Apple Corporation. The picture may be stored as a PICT file on a Macintosh. Digitized sound may be stored as an AIFF file on a Macintosh. An authoring tool, such as Macromedia Director sold by Macromedia is Corporation of San Francisco, Calif., may be used for creating parts of the Talking Dictionary.

The Talking Dictionary may be stored on CD-ROM or interactive television. In this case, it may be preferable to utilize pointers to animations and sounds, and to store them separately from the data records. This allows the data record to be cached in memory, or on the hard disk, providing more efficient access.

The special information fields may contain any special information that may inform the user of special attributes of the word. Examples of special information include (but are not limited to), whether a particular word/spelling may have two pronunciations; synonyms, antonyms, homonyms, etc.

Sequence information is the order in which the word information is displayed. Some entries may have all fields present; others may not. The visual animation may be displayed with the definition, the usage example, the sound effect, or other associated information. For example, with reference to the numbered attributes in Table 1, sequence information 6, 3, ⅛ may indicate that the computer first pronounces the word; then states the definition; then displays the animation along with a usage example.

For the phonetic/phonemic coding of the word, the international phonetic alphabet may be used. Other systems may alternatively be selected, such as are often found as front matter in printed dictionaries.

With respect to the multimedia elements, design trade offs are involved between space, quality and the number of entries. Options include: storing sound and animation in compressed format, and using on-the-fly decompression for presentation of these elements. In a Macintosh environment, PackBits and UnpackBits OS calls may be used for this purpose (these work best with pictorial information). Well known algorithms for lossless or lossy compression, for example LZW (Lempel-Ziv & Welsh), may be used. Suitable compression programs are available for the Macintosh from Aladdin Software, 165 Westridge Drive, Watsonville, Calif.

If necessary, space may be saved by: (1) providing animations in black and white instead of color; (2) using a smaller bit depth; (3) using digitized speech at a low sampling rate; (4) using text-to-speech technology instead of, or in addition to, digitized speech. Other techniques known to those of ordinary skill in the field of programming applications having graphics and sound may also be used.

Many alternative embodiments are contemplated. For example, the Phonic Engine may also be included in other reference works, in a writing program, as a command interpreter, or any other situation where a person who does not know how to read or write wishes to understand or denote written language.

Some databases may have initial/final sound combinations (e.g., words beginning with "s") for which a large number of entries are present. One of ordinary skill in the art of programming would readily understand how to add logic to obtain a secondary indicator. For example, the system may request that a user narrow down an initial "s" to include or eliminate a word beginning with an s blend. Alternatively, the to system may ask for any median sound in the word.

The inventor is currently developing a prototype Talking Dictionary. This prototype deals with a specific subset of words: words depicting animals. For purposes of this discussion, this shall be referred to as the "Prototype." There are approximately 200 animals in this Prototype.

The exemplary Prototype is implemented using Microsoft Visual Basic, Professional Edition, Version 3.0 for Windows. The target environment for the prototype includes: Windows 3.1; CD-ROM (or other high capacity random access storage device); sound board; and speakers. For performance or other purposes, DLLs written in C or another compiled programming language may be utilized to accomplish certain tasks. Also, Windows API calls may be declared and used if necessary to enhance performance or achieve other objectives. As an alternative to Visual Basic, another programming environment such as C or C++ may be used.

With reference to FIG. 1, the menu bar may be implemented using a command button array; the allographs 12a–12c may utilize an image control array; the initial sound box and final sound box may also be image controls; and the word box may be a picture control. It will be understood by one of ordinary skill in programming systems using GUI's, that alternate control types or custom controls may be used. Controls for displaying words may depend on whether the words are displayed as text or bitmapped graphics.

For presentation of sound (.WAV files) within the program, the PlaySound API function is used. Animations are displayed using Microsoft Video for Windows, compressed with the Microsoft RLE Codec. The MCIWNDX control, from the Microsoft Video for Windows development kit, is used for presenting the animations. The animations may be rendered using Autodesk Animator Pro, along with other graphic tools.

A picture clip control may be useful in speeding up graphic presentation of the allographs and associated pictures.

When the user initiates the Prototype, he or she views the menu bar, the initial and final allograph boxes; and the word box. When the user rolls the mouse over a letter, the letter is pronounced. When the user clicks on a letter (using a pointing device) or otherwise selects a letter, the associated allographs are displayed. The user preselects whether initial or final allographs are displayed by first clicking on the initial or final allograph box. When either of these is clicked, all allographs are cleared from the screen, and the user is presented with allographs of the type selected.

When the user rolls the mouse over a displayed allograph, information about the allograph is spoken, such as "This is the letter b. It makes the sound /b/ as in balloon." If the user then clicks on this allograph, the allograph display (in this case a picture of a balloon, and the word balloon) are displayed in the initial allograph box. Final allograph is selected in the same manner. If the user changes his or her mind, he or she may replace the selected initial or final allograph by clicking on the appropriate allograph box, then selecting the desired allograph for the desired initial or final sound.

After the user has selected initial and final allographs, he or she may initiate a search for words matching the sounds associated with these allographs by clicking on the Word Entry Box. One of ordinary skill in the art of programming would understand that one may use a separate or other indicator for this, such as a command button of a particular color, or with a symbol or word on it, or a key on the keyboard.

Figure 5:
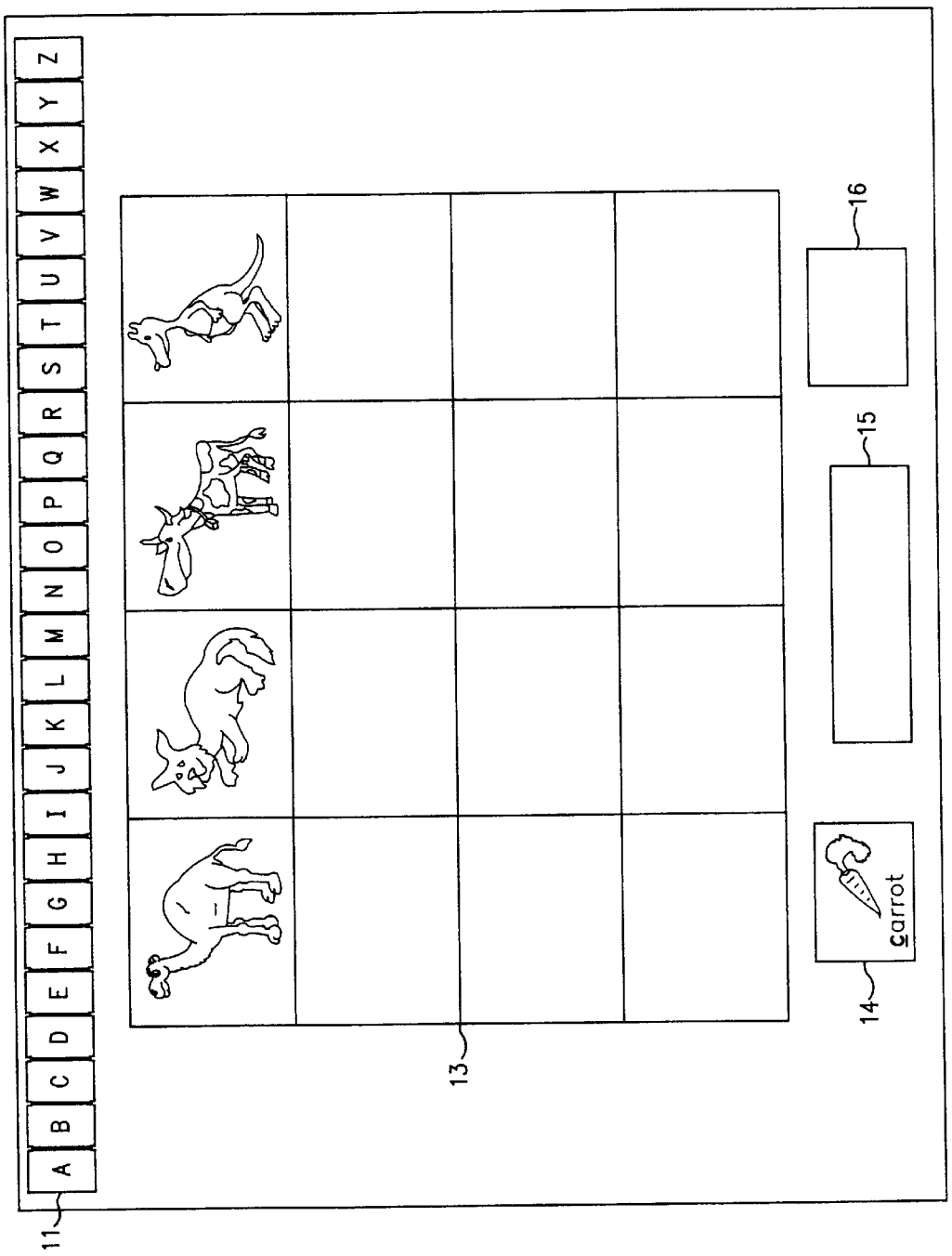
FIG. 5 is a diagram of an alternate computer video display executing a process according to the present invention within a software program.

When the search for matching words is complete, a matrix or list of selections is presented within display area 13, as shown in FIG. 5. In the exemplary Prototype, each selection in the matrix has a small picture of an animal associated with it, and the name of the animal displayed adjacent to the picture. When the user rolls the mouse over a selection, the name of the animal is spoken. When the user clicks on the selection, a display is shown within display area 13 containing: 1. A definition (description) of the animal, 2. An interesting fact about the animal, and 3. The same picture of the animal. The definition and interesting fact will each have an icon next to it which, if clicked on, will cause a .WAV file to be played speaking the displayed words. If the animal itself is clicked on, or an icon adjacent to the animal, such as a filmstrip icon for example, a MCIWNDX control will appear with the first frame of the associated animation. The user may then start the animation, and manipulate it, using a slider to go slower, faster, and backwards. The user may view the animation as many times as he or she wishes.

One of ordinary skill in the art of programming would understand that if only one choice is matched with the initial/final phonemes, the list or matrix need not necessarily be displayed, but only the display of the selected choice.

When the user wishes to select another animal, he or she clicks on the initial or final sound input box. This causes the screen to appear in its initial configuration. One of ordinary skill in the art of programming would understand that there are numerous ways to return to the initial state, such as a command button, a keyboard key, and so forth.

FIG. 5 depicts an exemplary interface of the Phonic Engine after a matched list has been presented. In this figure, only an initial sound has been used. The figure depicts the display generated by the exemplary Prototype. With the sound /k/ having been chosen as the initial sound, pictures of a camel, cat, cow and kangaroo may be displayed, among others.

If this exemplary interface were to be adapted for use in conjunction with another type of system, for example, a "Pay Per View" interactive television (ITV) system, the movie name "Casper", a picture of its main character or a reduced size version of its print advertisement may be displayed among others. If the interface were used in an ITV, online services, kiosk or other scenario where a child may have access to motion videos showing the history, mechanics, science and other information about certain inventions, pictures of a camera and a cuckoo clock, among others, may be displayed.

One of ordinary skill in the art of multimedia programming would understand that the animation may be presented adjacent to the definition and interesting fact, or as a larger animation, temporarily obscuring other information on the screen. In the latter case, one of ordinary skill in the art of programming would understand that means for reviewing the written material could be accomplished via clicking the word box, a command button, the original selection with picture of the animal, minimized and placed appropriately on the screen, or another indicator appropriately placed on the screen or by a keyboard key.

In the exemplary Prototype, the searching process may be accomplished by processing an array of a user defined data type, where each array member may include information used to select the array member and information used to display the associated data, such as: indicators of initial and final (or just an initial) phonemes associated with the name of the animal, a filename of a small picture for the list or matrix and display, the name of a file containing associated animation data; the name of a file containing associated word, definition, interesting fact, etc. Members matching the initial and final (or just initial) phonemes are displayed in the above stated list or matrix. If the list or matrix overflows the allocated screen area, scrolling or paging will be used to display the remaining selections. One of ordinary skill in programmning would understand that the array may be an array of a user defined type, or another set of properly organized data structures; and that such features as filenames, file formats, data organization, and data aggregation, for example, may be implemented in a variety of ways.

Another contemplated variation uses only the initial phoneme for selection. For a young audience, and for a database in which the number of items is sufficiently limited that a set of a readily browsable choices are likely to be displayed for any initial phoneme, this type of selection process may be useful.

In another variation, each entry in a collection of meanings has no associated text. Just sensory data about the meaning. For example, in the Talking Dictionary or Prototype systems, it is not necessary to have any text associated with an entry to locate it by orthographic or phonetic/phonemic component(s).

In another variation, the Phonic Engine is used in conjunction with a television receiver containing an electronic program guide (EPG) such as the StarSight® system, available on Zenith® television receivers, where users can utilize it as a navigational tool to select programs. In yet another variation, the Phonic Engine may be used in connection with interfaces to interactive television systems or online services. In these applications, one may use the Phonic Engine to select merchandise, or perform other transactions which would otherwise not be selectable to those with limited language capability. For example, if a child wants to view the program Sonic The Hedgehog®, or play the video game Sonic Spinball®; and if the number of programs and/or video games was very large, the user could input indicators for the phonemes /s/ and /k/, or /s/ and /g/ (for Sonic, and Sonic the Hedgehog, respectively), be shown a matrix of pictures of all corresponding items, of which the above would be a part; be able to browse the selection and (optionally) hear the names of the selections pronounced, and finally select the desired item. One of ordinary skill in the art of designing user interfaces would recognize that the phonetic/phonemic and other indicators could be on-screen, on a simple remote device, or on a remote device with display and selection capabilities.

In another variation, it would be apparent to one with ordinary skill in programming for networks, that this technology can easily be implemented across networks, via TV or interactive TV or, online services, for both navigation and selection of games, programs, merchandise or other materials or information; in kiosks at children's museums and other places where a child, or one with limited language capabilities, is trying to find information.

An on-screen user interface of this type may be substantially the same as that shown in FIG. 1 except that it shows small pictures adjacent to the words or may not show words at all. Alternatively, a display of the type described above, with reference to FIG. 5 may be used.

In another variation, it would be apparent to one of ordinary skill in the art of programming that the Phonic Engine could be incorporated into a computer or other command interpreter. For example, an interface similar to FIG. 1 would be displayed on a CRT screen, and a child or one with limited language could use the interface as in the exemplary Talking Dictionary. In this case one could display a list of commands corresponding to computer commands, and the commands would be sequentially pronounced, or pronounced when clicked on.

In another variation, blends and other orthographic information (e.g. prefixes or suffixes) may be used in conjunction with sensory elements (e.g. pictures or sounds) to lead to selection of a meaning. In this variation, the blends could be selected in the same fashion as allographs in FIG. 1, that is, by first selecting the letter with which the blend or other orthographic element begins.

The Phonic Engine may generally be applied as a software object to any type of selection process in an application where a user provides a list of selections and corresponding language-based data, such as initial and final phonemes, prefixes, suffixes or other language components. In this form, the Phonic Engine could be integrated with the application.

From a functional point of view, the visual interface presented by this object may be substantially the same as that shown in FIG. 1. The object, however, may allow a user to design an alternative interface by providing a set of entry points and event handlers that could be associated with controls or objects on a screen or other objects using well-known techniques. The interface may be adapted to provide only phonetic/phonemic or orthographic choices associated with the possible selections and to yield user input in terms of, for example, the index of a desired selection or the initial and final sounds of the desired selection. Under appropriate circumstances, it may be desirable for the object to accept only initial sounds or to accept language components other than initial and final sounds, such as medial sounds, prefixes or suffixes.

The input data may be used by the object as search criteria for a list of selections provided by the application programmer. The resulting matches may be provided for the user to browse, either visually, using pictures provided by the programmer; aurally, using 1) sound-clips provided by the programmer, or 2) an internal text-to-speech translator to say text provided by the programmer.

The visual interface presented by this object may be substantially the same as shown in FIG. 1. The object may also allow a user to design an alternative interface through a number of means, such as varying the size, design or selection method of the controls; or by varying the type of information (phonetic/phonemic, orthographic, etc.) provided to suit the audience and/or the associated possible selections.

Integration may occur to different degrees. For example, the Phonic Engine could obtain the user input only, and pass it to a routine supplied by an application developer; or could be aware of the database and selection criteria, search the database, and provide indexes or pointers of matched entries to a routine which would manage further selections/transactions; or it could be made aware of the nature of the media within the database, receive further selection from the list of matches, and pass this to a supplied routine for further processing; and so on.

MECHANICAL EMBODIMENT

As mentioned above, mechanical devices may also be used to practice the invention. An exemplary alternative mechanical embodiment may include a selectively punched card for each respective word in the dictionary or database. U.S. Pat. Nos. 2,556,232 to Stiller, 2,647,519 to R. Brinkmann to Broxten and 4,081,079 to Roth et al. are hereby expressly incorporated by reference for their teachings on the construction and use of mechanical selection devices for card indexes.

The exemplary mechanical embodiment includes a device and technique such as that described in U.S. Pat. No. 2,647,519 to R. Brinkmann. Familiarity with that patent is assumed, and a detailed description of the complete Brinkmann device is not repeated herein. In Brinkmann, a first selector card is placed in the front of a stack of index cards, and an identical selector card is placed in the back of the stack. Cards are selected by placing a selector rod through a hole in the front selector card, through the stack, and out through the rear selector card. The cards in the stack are allowed to drop, except for the cards having circular holes that line up with the holes in the selector cards through which the selector rod has been inserted.

Figure 4A:
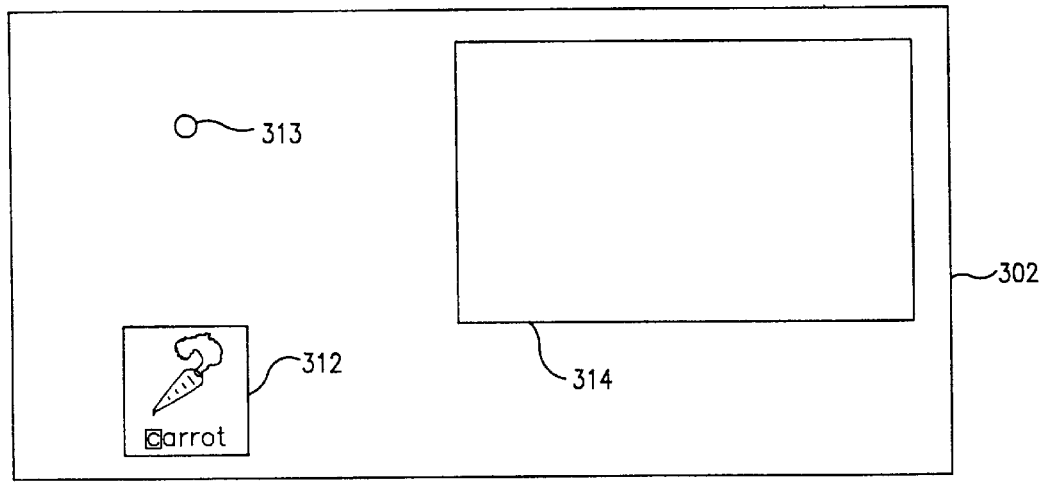
FIG. 4A and 4B show selector cards that are used in a further exemplary embodiment of the invention.
Figure 4B:
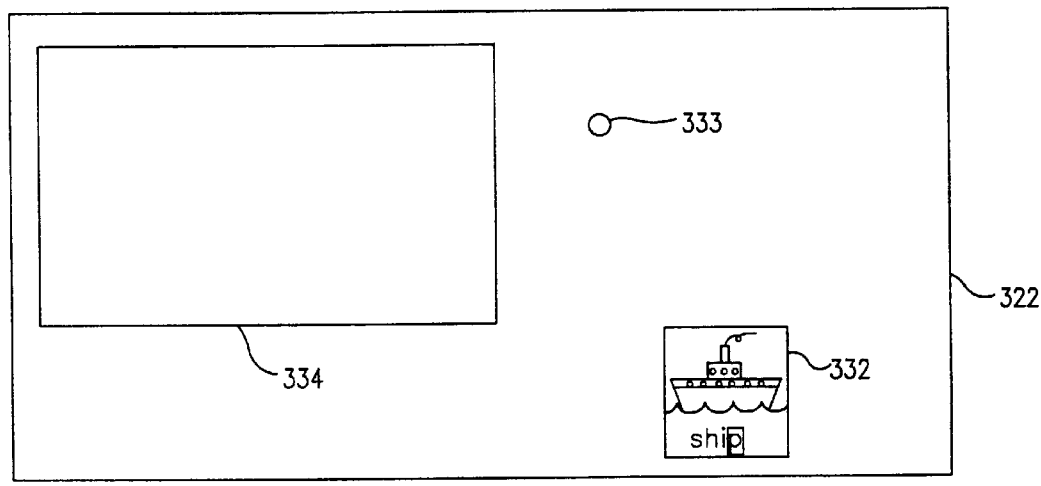

Reference is now made to FIGS. 4A and 4B. In the exemplary mechanical embodiment of this invention, a plurality of word cards (not shown) are stacked horizontally, from front to back. Each word card has a first circular hole in a respective position corresponding to the first sound of the word, a second circular hole in a respective position corresponding to the final sound of the word, and a plurality of elongated slots in positions that correspond to the remaining sounds of the language. The use of elongated slots and circular holes is explained in detail in the Brinkmann patent incorporated by reference herein. Each card also includes a picture and spelling of the word. Additional information may also be included.

Selector cards 302 and 322 (shown in FIGS. 4A and 4B) are provided for placement at the front and back of the stack. To allow independent selection of initial and final sounds, respective selector rods are used for the initial sound and the final sound. Two sets of initial sound selector cards 302 are provided for initial allograph selection, and two sets of final sound selector cards are provided for final allograph selection. This allows placement of selector cards both in the front of the stack and in the back, for proper alignment of the selector rods.

Initial selector card 302 (FIG. 4A) includes a picture 312 of a word that includes a respective allograph in the initial position, the spelling of that word (with the pertinent sound highlighted), and a single circular hole 313 corresponding to that allograph. Final selector card 322 (FIG. 4B) includes a picture 332 of a word that includes a respective allograph in the final position, the spelling of that word (with the pertinent sound highlighted), and a single circular hole 333 corresponding to that allograph. Card 302 has an opening 314, and card 322 has an opening 334. By placing an initial sound selector card 302 and a final sound selector card 322 on top of one another, a pair of circular holes 313 and 333 is formed, corresponding to a respective initial/final sound pair.

Once the user chooses an initial/final sound selector card pair 302, 322, the chosen pair of selector cards is placed in the front of the stack of word cards. A duplicate selector card pair is placed in the back of the word card stack for proper alignment of the selector rods. One selector rod is inserted through the circular hole 313. The non-selected cards are then allowed to drop, as described in Brinkmann. All of the cards remaining on the selector rods at this point have the desired initial sound. A selector rod is then inserted through the circular hole 333, and the rod 313 is removed. The non-selected cards are then allowed to drop. The remaining cards have both the desired initial sound and the desired final sound.

The user can peruse the remaining cards to find a card having a picture and spelling of the desired word.

Other mechanical embodiments are also contemplated.

The potential benefits of the Talking Dictionary and the underlying technology are numerous. It may increase literacy. Users may learn to exercise increased control and power over their environments through the use of written language. The Talking Dictionary allows children to play with written language. It provides children with a friendly, enjoyable environment which they can explore independently, motivated by their own innate enchantment, all the while increasing their literacy. It may further increase auditory discrimination and pronunciation skills.

While the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. A method for accessing information in a database comprising the steps of:

displaying one or more sets of orthographic information having associated input data;

receiving an indication of a possible selection of a first set from the one or more sets of displayed orthographic information;

in response to the received indication of a possible selection, causing information about the first set to be electronically spoken;

receiving a selection of the first sec of orthographic information;

causing the associated input data to be used as criteria for a search;

aurally providing information of matches resulting from the search.

2. The method of claim 1, wherein the first set of orthographic information comprises a word.

3. The method of claim 2, wherein the matches resulting from the search comprise words.

4. The method of claim 1, wherein the step of aurally providing information of matches resulting from the search further comprises the steps of:

displaying one or more matches resulting from the search, wherein the matches comprise orthographic information;

receiving an indication of a possible selection of a first match from the one or more matches;

in response to the received indication of a possible selection of the first match, causing information about the first march to be electronically spoken.

5. The method of claim 4 wherein the one or more sets of orthographic information and the matches are displayed with associated pictures.

6. The method of claim 4, further comprising the steps of:

receiving a selection of the first match;

in response to the received selection of the first match, providing additional information about the first match, the information selected from the set consisting of textual information, pictorial information, animation information, and combinations thereof.

7. The method of claim 1, wherein the step of receiving a selection of the first set of orthographic information further includes the step of displaying the associated input information in a designated region of a display screen, and the step of causing the associated input data to be used as criteria for a search further includes the step of receiving a selection of an indicator to initiate the search.

8. A method for accessing information in a database comprising the steps of:

displaying one or more sets of orthographic information having associated input data;

in response to moving a mouse cursor over a first set from the one or more sets of displayed orthographic information, causing information about the first set to be electronically spoken;

in response to pressing a mouse button while the mouse cursor is positioned over the first set of orthographic information, receiving the associated input data;

causing the associated input data to be used as criteria for a search;

aurally providing information of matches resulting from the search.

9. The method of claim 8, wherein the first set of orthographic information comprises a word.

10. The method of claim 9, wherein the one or more matches resulting from the search comprise words.

11. The method of claim 8, wherein the step of aurally providing information of matches resulting from the search further comprises the steps of:

displaying one or more matches resulting froth the search, wherein the marches comprise orthographic information;

receiving an indication of a mouse cursor positioned over one match from the one or more matches;

in response to the received indication of the mouse cursor positioned over the one match from the one or more matches, causing information about the one match to be electronically spoken.

12. The method of claim 11 wherein the one or more sets of orthographic information and the matches are displayed with associated pictures.

13. The method of claim 11, further comprising the steps of:

receiving a selection of the one match, by receiving all indication of a mouse button being pressed while the mouse cursor is positioned over the one match;

in response to the received selection of the one match, providing additional information about the one match, the information being selected from a set consisting of textual information, pictorial information, animation information, and combinations thereof.

14. The method of claim 13, wherein the step of receiving a selection of the first set of orthographic information further includes the step of displaying the associated input information in a designated region of a display screen, and the step of causing the associated input data to be used as criteria for a search further includes the step of receiving a selection of an indicator to initiate the search.

15. Apparatus for accessing information in a database, comprising:

means for displaying one or more sets of orthographic information having associated input data;

means for receiving an indication of a possible selection of a first set from the one or more sets of displayed orthographic information;

means, responsive to the means for receiving an indication of a possible selection, for causing information about the first set to be electronically spoken;

means for receiving a selection of the first set of orthographic information;

means for causing the associated input data to be used as criteria for a search;

means for aurally providing information of matches resulting from the search.

16. The apparatus of claim 15, wherein the first set of orthographic information comprises a word.

17. The apparatus of claim 16, wherein the matches resulting from the search comprise words.

18. The apparatus of claim 15, wherein the means for aurally providing information of matches resulting from the search further comprises:

means for displaying one or more matches resulting from the search, wherein the matches comprise orthographic information;

means for receiving an indication of a possible selection of a first match from the one or more matches;

means, responsive to the means for receiving an indication of a possible selection of a first match, for causing information about the first match to be electronically spoken.

19. The apparatus of claim 18, wherein the one or more sets of orthographic information and the matches are displayed with associated pictures.

20. The apparatus of claim 18, further comprising:

means for receiving a selection of the fist match;

means, responsive to the means for receiving a selection of the first match, for providing additional information about the first match, the information selected from the set consisting of textual information, pictorial information, animation information, and combinations thereof.

21. The apparatus of claim 20 wherein the additional information is provided via a medium or media selected from the set consisting of networks, television, interactive television, online services, and combinations thereof.

22. The apparatus of claim 20, wherein the additional information is selected from a group consisting of dictionary entries, encyclopedia entries, reference material, educational topics, database entries, games, merchandise, television programs, and combinations thereof.

23. The apparatus of claim 20, wherein the means for receiving the selection of the first set of orthographic information further includes means for displaying the associated input information in a designated region of a display screen, and the means for causing the associated input data to be used as criteria for the search further includes means for selecting an indicator to initiate the search.

24. The apparatus of claim 15, wherein the means for receiving the selection of the first set of orthographic information includes electronic equipment capable of conveying input signals, selected from the group consisting of computer selection devices, remote control devices, networks, and combinations thereof.

* * * * *

UNITED STATES PATENT AND TRADEMARK OFFICE
CERTIFICATE OF CORRECTION

PATENT NO.   : 6,148,286
DATED        : November 14, 2000
INVENTOR(S)  : Steven H. Siegel It is certified that error appears in the above-identified patent and that said Letters Patent is hereby corrected as shown below:

<u>Title page,</u>
Item [54] Title, should read -- METHOD AND APPARATUS FOR DATABASE SEARCH WITH SPOKEN OUTPUT --.

Item [57], line 17 of the Abstract, "for example, placing a mouse cursor over ie result," should read -- for example, placing a mouse cursor over the result, --.

<u>Column 2,</u>
Line 47, "entries $\cong (5000/44)/44^- 2.58$ (mean average)." should read -- entries$\cong(5000/44)/44 \approx 2.58$ (mean average). --.

<u>Column 17,</u>
Line 66, "receiving a selection of the first sec" should read -- receiving a selection of the first set --.

<u>Column 18,</u>
Line 62, "wherein the marches" should read -- wherein the matches --.

<u>Column 19,</u>
Line 8, "receiving a selection of the one match, by receiving all" should read -- receiving a selection of the one match, by receiving an --.

Signed and Sealed this

Sixteenth Day of October, 2001

*Attest:*

NICHOLAS P. GODICI
*Attesting Officer*    *Acting Director of the United States Patent and Trademark Office*